UNITED STATES PATENT OFFICE.

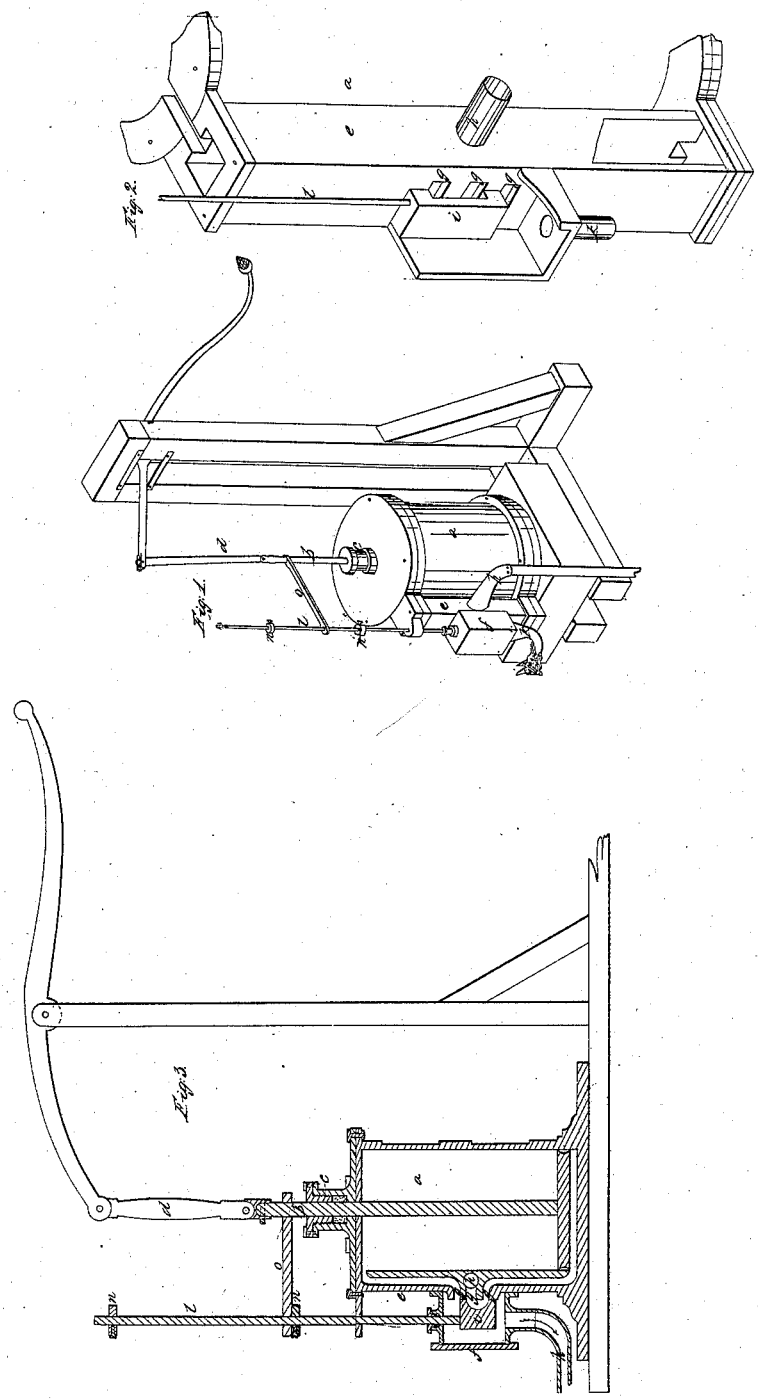

JOSEPH H. WEBSTER, OF ST. LOUIS, MISSOURI.

PUMP.

Specification of Letters Patent No. 3,933, dated February 28, 1845.

*To all whom it may concern:*

Be it known that I, JOSEPH HENRY WEBSTER, of the city of St. Louis, in the State of Missouri, have invented a new and useful Improvement in Pumps; and I do hereby declare that the following is a full, clear, and exact description thereof, reference being had to the accompanying drawings, which form a part of this specification, in which—

Figure 1, is a perspective view. Fig. 2, is a section showing the side pipe, valve, &c.; Fig. 3, a vertical section.

The nature of my invention consists in the modification by which I employ only one valve in a double acting pump, so as to be freed from the obstructions usual to pump-valves especially when using muddy water.

The construction of my machine is as follows. I use a cylinder ($a$) tight at both ends in which a plunger or piston of ordinary construction works, and the rod ($b$) of which comes out through the stuffing box ($c$) in one head; this is connected by a pitman ($d$) with a handle or other machine by which it is worked; on the side of the cylinder ($a$) there is a side pipe ($e$) which opens into the cylinder at top and bottom similar to the side pipe of a steam engine. At the center of the length of the side pipe a valve box ($f$) is fitted from which there are three oblong holes ($g$) Fig. 2, into the side-pipe and this side of the box forms the valve-seat. The center opening ($g$) Fig. 3 above named communicates only with the induction pipe ($h$) that enters the side pipe at a point opposite thereto on one side, in consequence of two partitions across the side pipe between the holes ($g$) the upper and lower holes ($g$) open a communication between the upper and lower ends of the cylinder and the valve box. On the valve seat a sliding valve ($i$) is fitted, that just covers two of the holes ($g$) without lapping, and opens a communication with the pipe ($h$) and the top of the cylinder as shown in Fig. 2, or, when slid down with the bottom of said cylinder, and leaves the other hole open into the valve box, from which there is an eduction pipe ($k$) to carry the water where it is required. The stem ($l$) of the valve extends up through a stuffing box in the top of the valve box, and parallel with the piston-rod ($b$) from which latter an arm ($o$) extends out at right-angles thereto, and through its end the valve stem slides; on this stem two collars ($n$) are put with set screws to hold them in their proper places; as the piston rod rises, the arm ($o$) strikes the upper collar ($n$) and lifts the valve into the position shown in Fig. 2, and as it descends it strikes the lower collar and causes the valve to drop, this takes place just as the piston comes to the end of the stroke. The valve is held to its seat by means of a spring if required.

Having thus fully described my invention what I claim therein as new and desire to secure by Letters Patent is—

The double acting suction and force pump with one valve, constructed and operating substantially in the manner and for the purpose herein set forth.

JOSEPH H. WEBSTER.

Witnesses:
J. J. GREENOUGH,
J. H. GODDARD.